United States Patent [19]
Goodson et al.

[11] Patent Number: 5,654,982
[45] Date of Patent: Aug. 5, 1997

[54] APPARATUS AND METHOD FOR DETERMINING CARRIER FREQUENCY OFFSET AND TIMING FREQUENCY OFFSET FOR DATA TRANSMISSION AND RECEPTION

[75] Inventors: Richard L. Goodson, Huntsville; Mickey C. Rushing, Harvest; Gary D. Hunt, Gurley; Lee T. Gusler, Huntsville, all of Ala.

[73] Assignee: Motorola, Inc., Schaumburg, Ill.

[21] Appl. No.: 496,640

[22] Filed: Jun. 29, 1995

[51] Int. Cl.[6] .................................................. H04B 1/38
[52] U.S. Cl. ............................................ 375/222; 375/364
[58] Field of Search ............................. 375/222, 226, 375/231, 364, 326; 395/200; 379/98; 370/110.2

[56] References Cited

U.S. PATENT DOCUMENTS

| | | | |
|---|---|---|---|
| 4,621,366 | 11/1986 | Cain et al. | 375/222 |
| 5,048,054 | 9/1991 | Eyuboglu et al. | 375/222 |
| 5,228,062 | 7/1993 | Bingham | 375/222 |

*Primary Examiner*—Stephen Chin
*Assistant Examiner*—T. Ghebretinsae
*Attorney, Agent, or Firm*—Nancy R. Gamburd

[57] ABSTRACT

An apparatus and method for a data communications device such as a modem (100, 101) to determine carrier frequency offset and timing frequency offset, from a received probe signal. The various embodiments utilizing a processor (108) or digital signal processor (106) receive first and second sets of a transmitted probe signal having known characteristics, and determine a set of phase differences for the tones comprising the probe signal (702, 703, 704, 705). The various method and apparatus embodiments then form a linear approximation from the set of phase differences to determine the carrier frequency offset and the timing frequency offset (706). In the preferred embodiments, the linear approximation is formed from a minimization of a least square error estimate proportionally weighted by either signal to noise ratios or normalized, average amplitudes of the set of tones of the received probe signal.

27 Claims, 4 Drawing Sheets

APPARATUS AND METHOD FOR DETERMINING CARRIER FREQUENCY OFFSET AND TIMING FREQUENCY OFFSET FOR DATA TRANSMISSION AND RECEPTION

FIELD OF THE INVENTION

This invention relates in general to data communications devices, and more particularly, to an apparatus and method for determining certain characteristics of received signals.

BACKGROUND OF THE INVENTION

Presently, data communications devices ("DCDs") and other data communications equipment ("DCE"), such as analog and digital modems, terminal adapters and routers, for example, are used to transfer or transport data between data terminal equipment ("DTE") such as personal computers, workstations, mainframe computers, and other terminals, over various communications channels such as telephone lines, T1 or ISDN lines, which also may be part of a computer network. Typically, the data is transmitted, received, or otherwise transferred in the form of a digitally encoded communication signal, which may include, for example, digitally encoded data transmitted on a carrier signal, having a predetermined or otherwise specified center frequency, that is modulated by a predetermined constellation (or transmit constellation) of signal points (such as quadrature amplitude modulation), at a particular (and usually predetermined) signaling rate. In current and proposed systems, the signaling constellation may include from five hundred to over 1600 signaling points.

At the sending or transmitting DCE, a carrier signal is thus modulated with the set of constellation signal points corresponding to the digital code or value to be transported over the channel. The channel, however, typically introduces or allows a variety of impairments or noise which affect the transmitted signal, such as amplitude distortion, envelope delay distortion, non-linear distortion, additive noise, white noise, and other distortions. For example, the transmission channel may introduce an impairment which shifts or displaces the frequency of the carrier, referred to herein as "carrier frequency offset", which may result in impaired or erroneous demodulation. With carrier frequency offset, a signal transmitted at a frequency of, for example, 1800 Hz, may actually be received from the channel or network at a frequency of 1801 Hz. In addition, the sending DCE signaling rate may not exactly match the receiving DCE signaling rate, affecting the sampling rate and sampling timing and, as a consequence, affecting the determination of the amplitude and phase of the received signal. This difference between the sending DCE signaling rate and the receiving DCE signaling rate will be referred to herein as "timing frequency offset". For example, the sending DCE may have a timing reference of 2401 Hz, the receiving DCE may have a timing reference of 2399 Hz, when both should have a timing reference of 2400 Hz. Before the digital data can be transported, therefore, the receiving DCE should both synchronize to the sending DCE signaling rate and also remove or accommodate the carrier frequency offset caused by the channel.

In order for the receiving DCE to both synchronize to the sending DCE signaling rate and also remove or accommodate the carrier frequency offset caused by the channel, prior art methods and apparatus have essentially incorporated the use of phase locked loops to track the carrier and timing frequency offsets. Other prior art methods and apparatus have incorporated the use of algorithms to track error, such that an initially large estimated error may converge over a period of time to a more accurate assessment of actual error. Other prior art methods have used band-edge timing compensation averaging using either some (and usually not all) of the available tones (of the training sequence) or a wideband signal.

A significant difficulty with such prior art methods and apparatus is often the length of time needed for them to properly and accurately determine and account for the carrier and timing frequency offsets. Typically, upon system start-up, as discussed in more detail below, each of the connected modems transmits a probe signal and other information to the other connected modem, engaging in a training period. The duration of the training period for determining and responding to the various parameters of the probe signal, however, may be relatively short. While the various iterative, phase locked loop and other methods mentioned above may ultimately provide reasonably accurate or usable results if given enough time and repetitions, such time may be unavailable or undesirable for high speed data transmission. As a result, there continues to be a need to provide data communications equipment with a mechanism for both rapidly and accurately determining and responding to both the timing frequency offset and the carrier frequency offset given a received probe signal, with a training period which has a limited duration.

DETAILED DESCRIPTION OF THE INVENTION

Figure 1:
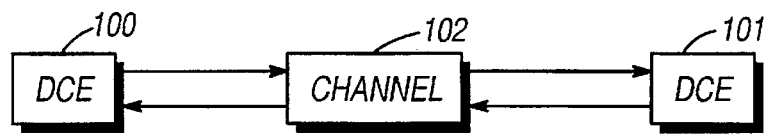
FIG. 1 is a block diagram illustrating modems connected to each other via a channel, for full duplex data transmission and reception.

FIG. 1 illustrates a first DCE 100, such as a first modem, connected to a second DCE 101, such as a second modem, via a channel 102. The modems typically operate in full-duplex, such that each may transmit data and receive data at the same time. In order to compensate for various distortions and impairments which usually exist or occur in the channel during data transmission, various protocols and standards have evolved, such as the International Telecommunication Union (ITU) Recommendation V.34, involving the use of a probe signal having predetermined, defined characteristics, transmitted from the sending DCE to the receiving DCE, during the initial communication period (training period) in which the two devices train with each other. For example, under the V.34 standard, the probe signal involves the simultaneous transmission of a sequence of twenty-one tones (frequencies) from 150 Hz to 3750 Hz, each tone of equal amplitude and having defined or known phase relationships, with each tone generally separated from other tones at intervals of 150 Hz or integer multiples of 150 Hz, and with some potential tones omitted, such as the 900 Hz, 1200 Hz, 1800 Hz and 2400 Hz tones. The probe signal is transmitted at two power levels, a first high power level (L1) followed by a second, nominal power level (L2) (6 dB lower than L1). The receiving DCE may analyze the received probe signal in light of the standard sequence assumed (or known) to have been transmitted, in order to determine such transmission parameters as the optimum symbol rate, the optimum carrier frequency, the carrier frequency offset, the timing frequency offset, the degree of non-linearity of the channel, and the transmit power level. Various references concerning the use and analysis of probing signals include the ITU-T Recommendation V.34; Eyuboglu et al. U.S. Pat. No. 5,048,054, issued Sep. 10, 1991, entitled "Line Probing Modem"; Ling et al. U.S. Pat. No. 4,987,569, issued Jan. 22, 1991, entitled "Fast Training Echo Canceller"; and Sridhar et al. U.S. Pat. No. 5,214,637, issued May 25, 1993, entitled "High Speed Two Wire Modem".

In order to rapidly compensate for the timing and carrier frequency offset, such a probe signal having predetermined characteristics defined under the V.34 standard, such as known sequence of tones at predetermined frequencies with predetermined and known amplitude and phase relationships, is sent from the sending DCE to the receiving DCE. In accordance with the various method and apparatus embodiments of the present invention, the probe signal is processed by the receiving DCE to determine the timing frequency offset and carrier frequency offset, using a least square error linear approximation methodology, having weighting parameters based upon either the signal-to-noise ratios ("SNRs") or received tone amplitudes in the preferred embodiments, using two or more intervals or tone sequences from the initial probe signal. The timing frequency and carrier frequency offsets determined in accordance with the invention herein are then used to initialize tracking loops in the receiving DCE, significantly decreasing the time required to accurately acquire the timing frequency and carrier frequency offsets.

Figure 2:
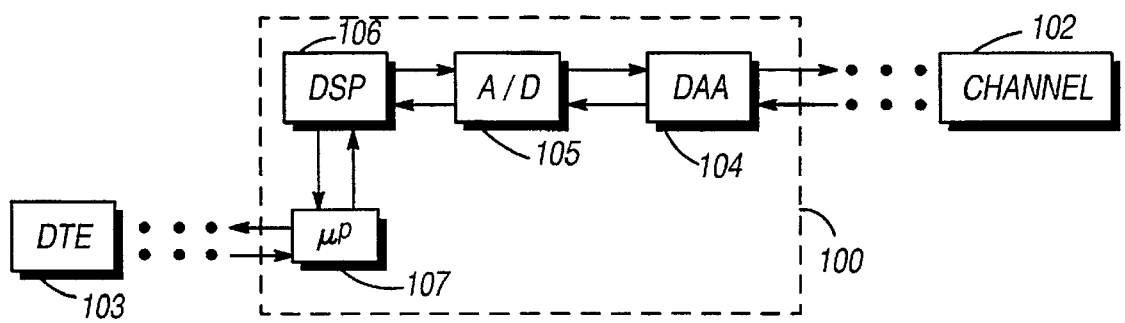
FIG. 2 is a block diagram illustrating a first embodiment of a modem or other DCE in accordance with the present invention.

FIG. 2 is a block diagram illustrating a first embodiment of a modem or other DCE in accordance with the present invention. As shown in FIG. 2, a modem 100 is coupled or connected to a DTE 103, such as a computer, and coupled to a channel 102, for data transmission and reception. Within the modem 100, a data access arrangement 104 known as a "DAA" receives an analog signal transmitted on the channel 102. DAAs are known in the prior art and may be made of a variety of discrete components, including analog multiplexers, resistors, capacitors, and operational amplifiers, or may be embodied in whole or part as an integrated circuit, and performs such functions as impedance matching and power level adjustment. Typically connected to the DAA 104 is an analog-to-digital and digital-to-analog converter 105, referred to herein as an analog-digital ("A/D") converter, such as an SGS Thompson ST 7544 or ST 7545, which converts an analog signal received from the channel 102 to digital form, and converts digital information to analog form for transmission over the channel 102. Equivalently to the use of an A/D converter, a coder-decoder ("codec") may be utilized in place of the A/D converter. The A/D converter 105 is then connected to a digital signal processor ("DSP") 106, such as a Motorola M56002. The DSP 106 is used in a first embodiment of the invention herein, performing the various functions described in detail below. The DSP 106 is connected to a microprocessor 107, such as a Motorola M68302, which may be coupled to a DTE 103 to transmit and receive digital information.

Figure 3:
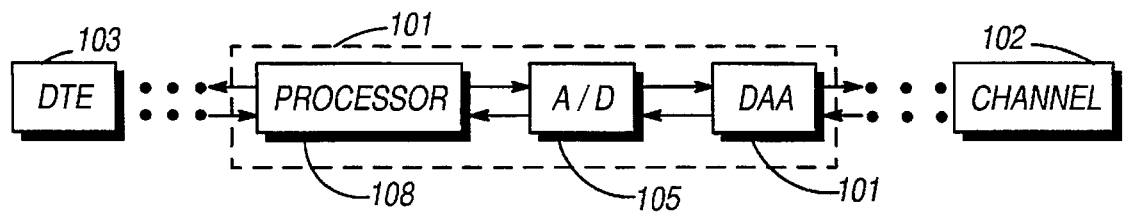
FIG. 3 is a block diagram illustrating a second embodiment of a modem or other DCE in accordance with the present invention.

FIG. 3 is a block diagram illustrating a second embodiment of a modem or other DCE in accordance with the present invention. Referring to FIG. 3, the DAA 104 and A/D converter 105 perform the same functions, may be the identical components, and are similarly connected as previously discussed with reference to FIG. 2. In contrast with the modem 100 of FIG. 2, however, FIG. 3 illustrates a processor 108, such as a Motorola M68356, which performs the functions of both the DSP 106 and the microprocessor 107 of FIG. 2. The processor 108 is used in a second embodiment of the invention herein, also performing the various functions described in detail below. The processor 108 may also be coupled to a DTE 103 to transmit and receive digital information. As a consequence of the interchangeability of a DSP with a processor in these various embodiments, the terms DSP and processor (or microprocessor) are used interchangeably and inclusively herein, such that use of one term may be interpreted to mean and include the various other processor embodiments.

For ease of reference, following is a list of symbols and abbreviations used herein and their associated meanings:

x(n) The complex analytic output of the initial processor component consisting of the probe signal received from the channel. This received probe signal is a set of tones ideally at frequency multiples of 1/T.

$f_i$ The ideal frequency of the $i^{th}$ tone of the probe signal.

$A_i$ The amplitude of x(n) at frequency $f_i$.

T The ideal period of the probe signal and the ideal frequency spacing between tones.

$f_{TX}$ The actual spacing between the tones at the transmitter.

P The number of samples of x(n) ideally in one period of the received probe signal.

$Pf_{RX}$ The actual measured receive sample rate of x(n).

$f_0$ The carrier frequency offset in the receiver relative to the receive sample rate.

j The square root of −1, i.e., the complex variable or operator commonly used in electrical engineering, mathematics and physics.

L The number of Fast Fourier Transforms ("FFTs") in a set.

M The number of periods delay between adjacent FFTs.

K The number of periods consumed by each FFT.

Y($f_i$) The conjugate product of two sets of FFTs. The phase of Y($f_i$) is ideally a linear function of frequency, and a linear approximation (linear curve fit) is used herein to determine the timing and carrier frequency offset.

$B_i$ The amplitude of the Y(fi) at frequency $f_i$.

$C_i$ The amplitude of the averaged FFT at frequency $f_i$.

w(m) The window function for the FFTs.

$R_{n,k}(f_i)$ The output of the $k^{th}$ FFT at time n.

$\Phi_i$ The phase resulting from the frequency domain processing at frequency fi. This phase is least squares fitted to a straight line using the weighted linear approximation method of the preferred embodiment of the present invention.

$w_i$ The weight function at frequency $f_i$ used by the weighted linear approximation method of the preferred embodiment of the present invention.

a The slope parameter the linear approximation resulting from the method of the preferred embodiment of the present invention.

b The zero-frequency parameter the linear approximation resulting from the method of the preferred embodiment of the present invention.

Figure 4:
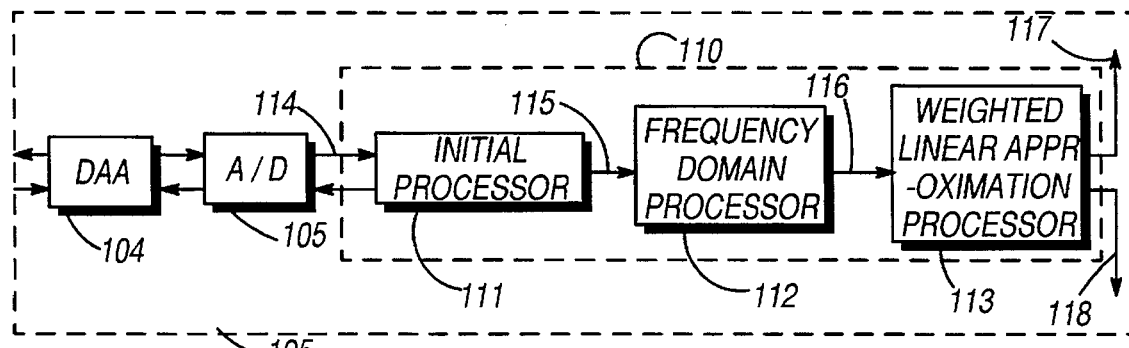
FIG. 4 is a block diagram illustrating the functional components of an embodiment of the present invention.

FIG. 4 is a block diagram which illustrates the functional components of an embodiment of the present invention. Referring to FIG. 4, as mentioned above, the invention herein may be embodied using a DSP (or as a processor) 110. Accordingly, as used herein, "processor" shall refer to and include a digital signal processor, a microprocessor, or any other integrated circuit which may combine the functions of a DSP and microprocessor. As discussed in more detail below, the DSP or processor 110 has three major programmable functional blocks or components, an initial processor 111, a frequency domain processor 112, and a weighted linear approximation processor 113.

As discussed with reference to FIG. 1, each modem transmits a probe signal to a receiving modem during the training period of the V.34 protocol. The probe signal consists of a sequence of equal amplitude tones with predetermined phase relationships. The tones are ideally spaced in integer multiples of 1/T Hz apart, where T is the ideal period of the probe signal. However, due to inaccuracies in the transmit timing reference, the tones may be actually spaced at frequency increments of $f_{TX}$ Hz apart, where $1/f_{TX}$ is the actual period of the probe signal. The probe signal may then be represented as $$Re \left\{ \sum_i e^{j(2\pi i f_{TX} Tn + \beta_i)} \right\}$$

where $f_i$ is the frequency of the $i^{th}$ tone, j is the square root of $-1$, $\beta_i$ is the phase angle associated with the $i^{th}$ tone, and Re is the real operator. Also as mentioned above, the channel may distort the probe signal in several ways. For example, it can introduce amplitude distortion, envelope delay distortion, non-linear distortion, additive noise, and carrier frequency offset. Referring to FIG. 4, such a probe signal containing noise and other distortions is received by the DAA 104 and A/D converter 105, for processing by the initial processor 111.

The A/D converter samples the received probe signal, and inputs the sampled probe signal on line 114 to the initial processor 111, which converts the received, sampled probe signal into a complex analytic signal. The sample time interval of the initial processor output is ideally T/P, where P is an integer referring to the number of samples of the received probe signal. However, due to inaccuracies in the receive timing reference, the actual receive sampling rate may be slightly different than P/T, and $Pf_{RX}$ may be the actual measured receive sampling rate.

As discussed in more detail below with reference to FIG. 5, the output of the initial processor 111, referred to as x(n), is $$x(n) = \sum_i A_i e^{j[2\pi(f_i \frac{f_{TX}}{f_{RX}} + f_o)\frac{nT}{P} + \gamma_i]}$$

where n is the sequence number in a sequence of samples (discrete time index), $A_i$ is the amplitude of tone i, and $\gamma_i$ is the phase angle associated with the $i^{th}$ tone. Each tone frequency is scaled by $f_{TX}/f_{RX}$, the timing frequency offset, and is offset by $f_o$, the carrier frequency offset. Referring to FIG. 4 (and FIG. 5), the output of the initial processor 111 (referred to as x(n)) is transmitted to the frequency domain processor 112 on line 115.

Figure 6:
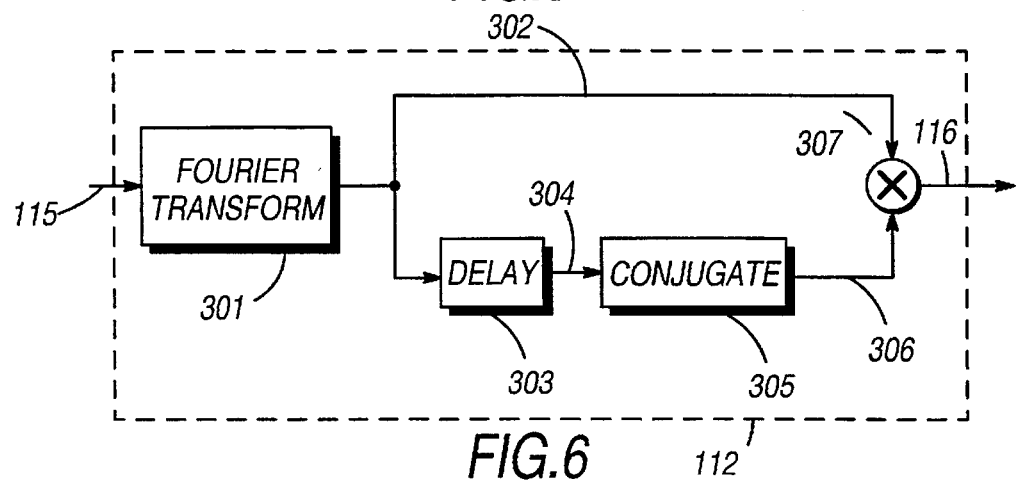
FIG. 6 is a block diagram illustrating the frequency domain processor component of a processor in accordance with the present invention.

The frequency domain processor 112 transforms x(n) into the frequency domain, then transforms x(n) delayed by D periods into the frequency domain, and calculates the conjugate vector product of these two frequency domain signals, as discussed in more detail in reference to FIG. 6. The resulting signal transmitted on line 116 may be independent of the time index n, and may be represented by $$Y(f_i) = B_i e^{j2\pi[f_i(\frac{f_{TX}}{f_{RX}} - 1) + f_o]DT} = B_i e^{j\Phi_i}$$

where $B_i = |A_i|^2$, D is the number of periods of delay, and $\Phi_i$ is the (average) phase difference between two or more samples of the high and low power probe signals for an $i^{th}$ tone.

As discussed in more detail below with reference to FIG. 8A, the phase of $Y(f_i)$ is a linear function of frequency, with a slope parameter proportional to $(f_{TX}/f_{RX})-1$ (timing frequency offset) and the zero frequency (or y-intercept) parameter proportional to $f_o$ (carrier frequency offset). Accordingly, by developing a linear function or a linear approximation of the phase of $Y(f_i)$ as a function of frequency, the timing and carrier frequency offset may then be determined from the slope parameter and the zero frequency parameter, respectively. However, if noise is present on the channel as expected under most if not all circumstances, the measured, noisy phase difference parameters may not form a precise linear function of frequency, but may be distributed around each frequency point following a probability distribution function for that frequency. A weighted linear approximation method is used herein, shown as block 113 in FIG. 4, to perform a least squared error fit of the noisy phase points to form a linear approximation. The results from such a weighted linear approximation method are $f_{TX}/f_{RX}$ (output on line 117) and $f_o$ (output on line 118).

Not shown in the figures, once $f_{TX}/f_{RX}$ is determined, it is multiplied by a proportionality constant and loaded into a frequency accumulator of a second order timing loop to provide for timing frequency synchronization for the modem or other DCE. The actual proportionality constant chosen may be dependent on the particular implementation of the timing loop and is empirically determined. After the timing loop is initialized, the receiver will be approximately timing frequency locked (timing frequency synchronized) with the sender. As a consequence, $f_o$ should also be scaled by $f_{RX}/f_{TX}$ to also compensate for the new sample rate. Accordingly, $f_o f_{RX}/f_{TX}$ may be multiplied by another proportionality constant (also empirically determined) and loaded into a frequency accumulator of a second order carrier loop to provide the appropriate carrier frequency synchronization.

Figure 5:
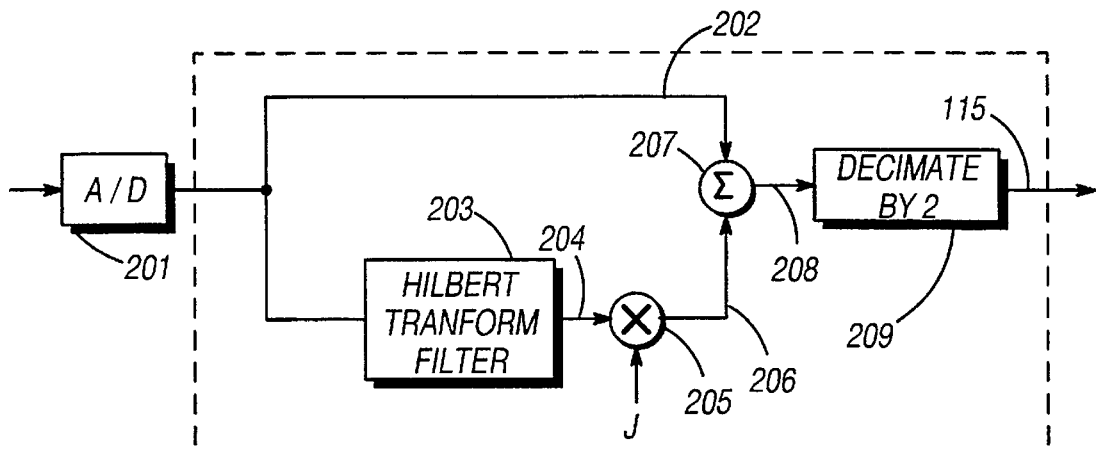
FIG. 5 is a block diagram illustrating the initial processor component of a processor in accordance with the present invention.

FIG. 5 is a block diagram illustrating the initial processor component 111 of a processor used in accordance with the present invention. Referring to FIG. 5, an A/D (analog-digital) converter 201 samples the received probe signal at a rate $2Pf_{RX}$, forming a sampled probe signal transmitted on line 202 which may be represented as:

$$Re\left\{ \frac{1}{2} \sum_i A_i e^{j[2\pi(f_i \frac{fTX}{fRX} + f_o)\frac{nT}{2P} + \gamma_i]} \right\}$$

The sampled probe signal is transmitted on line 202 to a Hilbert transform filter 203, which may have the following ideal transfer function:

$$H(e^{j2\pi f}) = \begin{cases} -j, & f > 0 \\ j, & f < 0 \end{cases}$$

The output signal on line 204 from the Hilbert transform filter 203 is multiplied by j in multiplier 205. The combined transfer function of the Hilbert transform filter 203 and the multiplier 205 may be the following (ideal) transfer function:

$$jH(e^{j2\pi f}) = \begin{cases} 1, & f > 0 \\ -1, & f < 0 \end{cases}$$

producing an output signal on line 206. The sum of the sampled probe signal (on line 202) and the output signal from the combined Hilbert transform filter and multiplier (on line 206), using the summer 207, yields a complex analytic signal on line 208. This complex analytic signal is zero for negative frequencies. Because the negative frequency components have been eliminated, the sample rate may be reduced (decimated) in block 209 by a factor of 2 without aliasing, resulting in the output on line 115 from the initial processor 111 of:

$$x(n) = \sum_i A_i e^{j[2\pi(f_i \frac{fTX}{fRX} + f_o)\frac{nT}{P} + \gamma_i]}$$

FIG. 6 is a block diagram illustrating the frequency domain processor component of a DSP or of a processor used in accordance with the present invention. The output of the initial processor x(n) is input on line 115 to the Fourier transform block 301, which transforms the output of the initial processor x(n) from the time domain to the frequency domain. The output of Fourier transform block 301 is a frequency domain signal on line 302 which may be represented by:

$$X_n(f_i) = C_i e^{j[2\pi f[(f_i \frac{fTX}{fRX} - 1) + f_o]\frac{nT}{P} + \lambda_i]}$$

where $C_i = A_i$ and where $\lambda_i$ is a phase angle which may have resulted from the Fourier transformation.

Continuing to refer to FIG. 6, $X_n(f_i)$ is delayed in delay block 303 by LMP samples, where L,M, and P are integers, L is the number of FFTs in a set, M is the number of periods of delay between adjacent FFTs, and as indicated above, P is the number of samples in one period of the received probe signal. In a preferred embodiment, L is 16, M is 2, and P is 32. The resulting signal from the delay block 303, appearing on line 304, is transformed by the complex conjugate block 305 to form a complex conjugate on line 306, which may be represented as:

$$X^*_{n-LMP}(f_i) = C_i e^{-j\{2\pi f_i(\frac{fTX}{fRX} - 1) + f_o]\frac{(n-LMP)T}{P} + \lambda_i\}}$$

The complex conjugate on line 306 (formed from a first set of Fourier transforms of the probe signal and delayed) is multiplied by the current, second set of Fourier transforms of the incoming probe signal then appearing on line 302, in multiplier 307, to produce a phase difference signal appearing on line 116, which may be represented as:

$$Y(f_i) = B_i e^{j[2\pi f_i(\frac{fTX}{fRX} - 1) + f_o]LMT} = B_i e^{j\Phi_i}$$

where $\Phi_i$ is the phase difference between the two sets of Fourier transforms of the probe signal. Equivalently to this delay, complex conjugate and multiplication procedure in the frequency domain, other embodiments may include convolution in the time domain.

Figure 7:
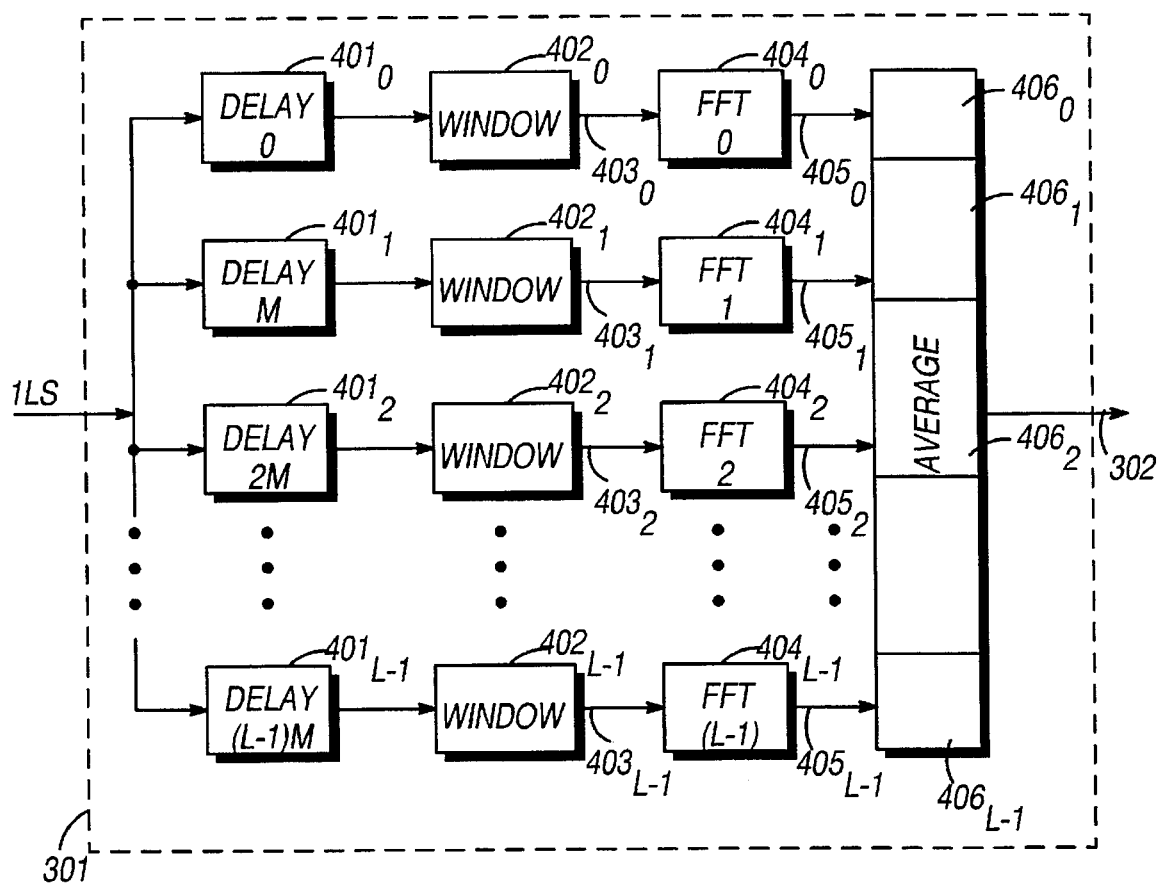
FIG. 7 is a block diagram illustrating the Fourier transform processor component of the frequency domain processor in accordance with the present invention.

FIG. 7 illustrates in additional detail the preferred embodiment of the Fourier transform block 301 of FIG. 6. In the preferred embodiment, the Fourier transform block 301 is a set of L identical FFTs (Fast Fourier Transforms), indexed from 0 to L−1, the outputs of which are averaged in block 406 to increase the signal to noise ratio (SNR) at each tone frequency $f_i$ of the probe signal.

Referring to FIG. 7, the probe signal from the initial processor 111 is applied to L delay units $401_0$ through $401_{L-1}$. The delay applied by each unit is fixed, and ranges from 0 to (L−1)M periods, corresponding to the FFT index 0 to L−1, where M is an integer. The output of each delay unit (a total of L units) is applied to a KP-point window function, blocks $402_0$ through $402_{L-1}$ (also a corresponding total of L window function blocks). In the preferred embodiment, a set of L Blackman-Harris windows are used to reduce sidelobe amplitude. A set of L Fast Fourier Transforms is performed in blocks $404_0$ through $404_{L-1}$, in which each FFT consumes K probe periods of data. In the preferred embodiment, K = 8. The output of each FFT appearing on lines $405_0$ through $405_{L-1}$ may be represented as:

$$R_{n,k}(f_i) = \frac{1}{KP} \sum_{m=0}^{KP-1} x(n - kMP - KP + 1 + m)w(m)e^{\frac{-j2\pi n f_i T}{P}}$$

$$\approx A_i e^{j\{2\pi f_i(\frac{fTX}{fRX} - 1) + f_o]\frac{(n-kMP-KP+1)T}{P} + \sigma_i\}}$$

where w(m) is the window function, k is the FFT index, and $\sigma_i$ is a phase angle which may have resulted from the Fourier transformation.

Continuing to refer to FIG. 7, the FFT outputs are averaged in blocks $406_0$ through $406_{L-1}$ to increase the signal to noise ratio at each tone frequency $f_i$. In the preferred embodiment, each FFT utilizes 256 samples of the incoming signal, and sixteeen FFTs for each tone frequency are averaged in blocks $406_0$ through $406_{L-1}$, to create a 16-fold redundancy which may tend to reduce any components attributable to noise and increase the signal to noise ratios. The averaged output of these Fourier transform blocks appears on line or bus 302 and may be represented as:

$$X_n(f_i) = \sum_{k=0}^{L-1} R_{n,k}(f_i)$$

$$= C_i e^{j\{2\pi i f_i(\frac{fTX}{fRX} - 1) + f_o\}\frac{nT}{P} + \lambda_i\}}$$

where $C_i = A_i$.

Figure 8A:
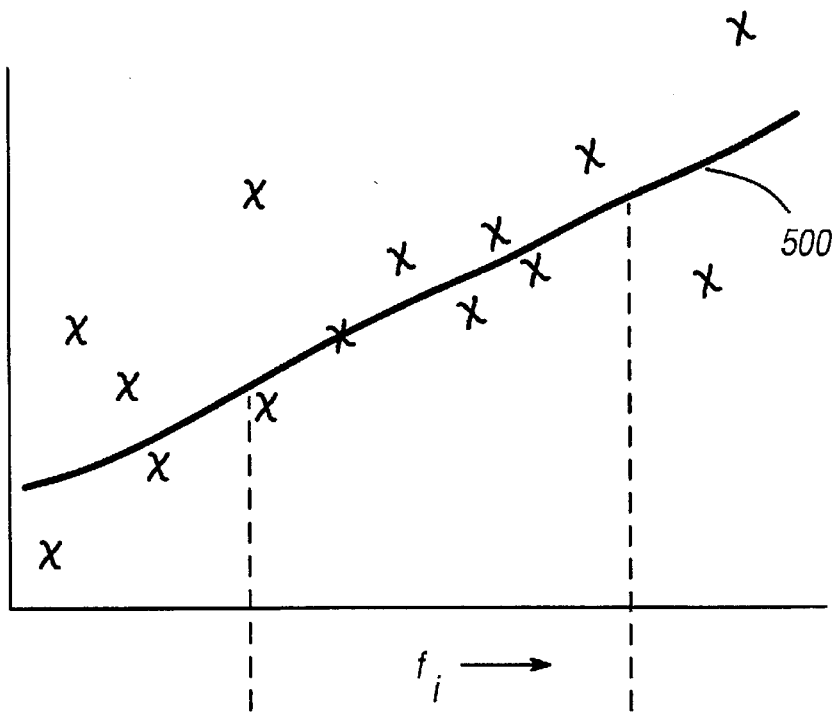
FIG. 8A is a graph illustrating the phase estimates containing noise, as a function of frequency, with a linear approximation in accordance with the preferred embodiment of the present invention.
Figure 8B:
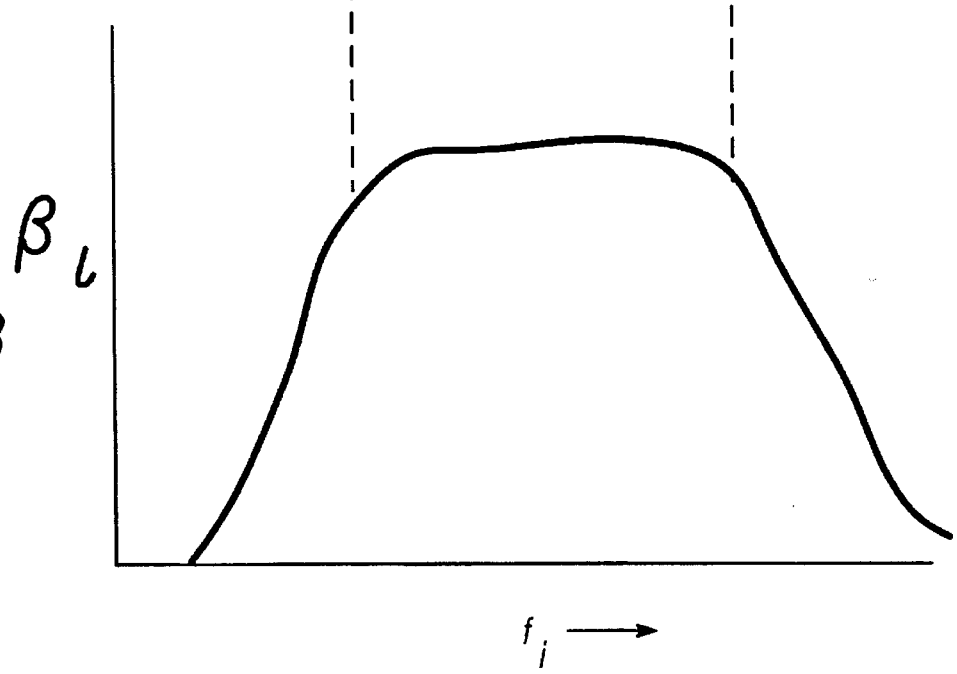
FIG. 8B is a graph illustrating the received probe signal amplitude as a function of frequency.

FIG. 8A is a graph illustrating the phase estimates $\Phi_i$ from the frequency domain processor 112 (of FIG. 4), as a function of frequency, the phase estimates $\Phi_i$ containing assumed noise from the transmission channel, with a linear approximation (corresponding to a particular timing and carrier frequency offset) in accordance with the preferred embodiment of the present invention. FIG. 8B is a graph illustrating the received probe signal amplitude as a function of frequency. As indicated from FIG. 8A and FIG. 8B, the phase estimates $\Phi_i$ tend to lie relatively or comparatively close to the linear approximation (straight line) 500 when the signal amplitude is also relatively or comparatively high. As the signal amplitude decreases, however, the variance (empirically determined) of the phase estimates increases, due to a change (decrease) in signal to noise ratio as a function of frequency, which is a function of a change (decrease) in signal amplitude relative or compared to noise amplitude, also as a function of frequency. Prior art methods of forming linear approximations, however, would tend to assume a constant variance, rather than such a variance which itself may vary as a function of frequency. Accordingly, in the preferred embodiment of the invention, this variance of the phase estimates, varying as a function of frequency, is taken into account in order to perform an optimal linear approximation, i.e., a curve fit of the phase points to a straight line.

In the preferred embodiment of the invention, a linear approximation methodology is implemented as the weighted linear approximation block 113 of FIG. 4. The linear approximation methodology weights the phase estimates proportionally to the signal to noise ratio of the signal as a function of frequency, thereby accounting for the variance of phase estimates as a function of frequency. The linear approximation methodology may be represented mathematically as an error minimization, preferably a minimization of the least squared error. Accordingly, in order to minimize $$\sum_i w_i(af_i + b + \Phi_i)^2$$

in the least square sense, where $(af_i + b)$ is a linear approximation (equation for a straight line) in which "a" is a slope parameter and "b" is the zero frequency parameter (y-intercept in Cartesian coordinates), and where $w_i$ is the weighting factor, the slope and zero frequency parameters may be determined as:

$$a = \frac{\sum w_i \sum w_i f_i \Phi_i - \sum w_i \Phi_i \sum w_i f_i}{\sum w_i \sum w_i f_i^2 - (\sum w_i f_i)^2}$$

$$b = \frac{\sum w_i \Phi_i - a \sum w_i f_i}{\sum w_i}$$

In another embodiment of the invention, the implementation may be simplified by substituting the signal amplitude as a weighting factor instead of the signal to noise ratio, such that $w_i = B_i$.

In addition, in order to extend the dynamic range of the linear approximation methodology, as the carrier frequency offset may be the dominant parameter, in the preferred embodiment an initial estimate of the carrier frequency offset may be computed while the first KP samples of probe signal are being utilized. These first KP samples and all subsequent samples are then rotated by this initial estimate of the carrier frequency offset, such that the final estimate of carrier frequency offset may be more accurate. In a preferred embodiment, moreover, a third set of FFTs may also be formed from the nominal power level of the transmitted probe signal, and utilized in another iteration of the methodology herein, also as a means to increase the accuracy of the estimates of the carrier and timing frequency offsets.

As mentioned above, in the V.34 protocol, the probe signal should be transmitted at two power levels. Samples from both the high and nominal power levels are used in the calculations, such that the samples from the high power level are typically used in the first set of Fourier transforms, with the samples from the nominal power level used in the second set of Fourier transforms (having been normalized for the expected (and relative) amplitude drop due to the decreased power level).

In summary, a first embodiment of the invention is an apparatus for determining timing frequency offset and carrier frequency offset, from a transmitted probe signal received via a channel. As in the V.34 and other protocols, the transmitted probe signal has a sequence of a plurality of tones having predetermined power, frequency, amplitude and phase characteristics, and the probe signal is transmitted and received for a minimum duration having a predetermined number of periods for each of the plurality of transmitted tones, such as in a training period, to form a plurality of sets of received probe tones. The apparatus then may comprise a digital signal processor, such as DSP 106 (FIG. 2), in which the digital signal processor has been programmed or may access a set of program instructions such that the DSP 106 is responsive to develop certain results or to perform certain activities or processes. First, the processor is responsive to determine a plurality of phase differences between a first set of received probe tones and a second set of received probe tones, for each received probe tone, to form a set of phase differences, blocks 111 and 112, FIG. 4. Second, the digital signal processor is responsive to the set of phase differences to determine a linear approximation of phase differences as a function of frequency, the linear approximation having a slope parameter and a zero frequency parameter, block 113, FIG. 4. Third, the digital signal processor further responsive to determine a timing frequency offset value from the slope parameter of the linear approximation and to determine a carrier frequency offset value from the zero frequency parameter of the linear approximation, block 113, FIG. 4.

In greater detail, the digital signal processor 106 is responsive to receive a a first set of sampled tones and a second set of sampled tones from an analog-digital converter 114 (FIG. 5). The digital signal processor 106 is further responsive to perform a Fourier transformation of the first set of sampled tones to form a first set of Fourier transforms and on the second set of sampled tones to form a second set of Fourier transforms, block 301 (FIGS. 6 and 7), and then to form a set of delayed complex conjugates of the first set of Fourier transforms, blocks 303 and 305, (FIG. 6). The DSP 106 is also further responsive to multiply the set of delayed complex conjugates of the first set of Fourier transforms by the second set of Fourier transforms to determine the set of phase differences, multiplier 307 (FIG. 6).

Various other features of this utilization of a digital signal processor in an embodiment of the invention are also apparent. For example, the digital signal processor may be further responsive to form the linear approximation by minimizing a least squared error function, FIG. 8A. In one alternative, the digital signal processor is responsive to determine a signal to noise ratio for each tone of the first set of received probe tones and the second set of received probe tones, to form a set of signal to noise ratios, and then form the linear approximation by minimizing a least squared error function proportionally weighted based upon the set of signal to noise ratios. In a second alternative, the digital signal processor is responsive to determine a normalized and average amplitude for each tone of the first set of received probe tones and the second set of received probe tones, to form a set of averaged amplitude, and then form the linear approximation by minimizing a least squared error function proportionally weighted based upon the set of averaged amplitudes, FIG. 8B.

In each such alternative, the digital signal processor 106 may be responsive to form the linear approximation by minimizing a least squared error function $$\sum_i w_i(af_i + b + \Phi_i)^2$$

as a function of frequency, and to determine the slope parameter "a" and the zero frequency parameter "b" by $$a = \frac{\sum w_i \sum w_i f_i \Phi_i - \sum w_i \Phi_i \sum w_i f_i}{\sum w_i \sum w_i f_i^2 - (\sum w_i f_i)^2}$$

$$b = \frac{\sum w_i \Phi_i - a \sum w_i f_i}{\sum w_i}$$

in which the summations $\Sigma$ are over a parameter "i" in which "i" is a predetermined number of tones of the probe signal, "$w_i$" is a weighting parameter, "$f_i$" is a frequency of an $i^{th}$ tone of the probe signal, and "$\Phi_i$" is an $i^{th}$ phase difference from the set of phase differences.

The present invention may also be embodied in a modem for data transmission and data reception, such as modem 100 or modem 101 (FIGS. 1, 2 and 3). Under the V.34 and other protocols, the modem has an initial training period for determining timing frequency offset and carrier frequency offset, from a transmitted probe signal received via a channel. The transmitted probe signal has a sequence of a plurality of tones having predetermined power, frequency, amplitude and phase characteristics, and the probe signal is transmitted and received for a minimum duration having a predetermined number of periods for each of the plurality of transmitted probe tones to form a plurality of sets of transmitted probe tones. The modem embodiment of the invention then comprises, first, a data access arrangement coupleable to a channel to receive the plurality of sets of transmitted probe tones, such as DAA 104 in FIGS. 2 and 3; second, an analog-digital converter coupled to the data access arrangement to sample and convert the plurality of sets of transmitted probe tones to form a plurality of sets of received probe tones, such as analog-digital converter 105 in FIGS. 2 and 3; and third, a processor coupled to the analog-digital converter to receive the plurality of sets of received probe tones, such as processor 108 in FIG. 3. As mentioned above, the processor may also be considered the combination of the DSP 106 and the microprocessor 107 of FIG. 2. As was the case for the DSP embodiment, the processor of the modem embodiment has been programmed or may access a set of program instructions such that the processor 108 is responsive to determine a plurality of phase differences between a first set of received probe tones and a second set of received probe tones, for each received probe tone, to form a set of phase differences. The processor 108 is also responsive to the set of phase differences to determine a linear approximation of phase differences as a function of frequency, the linear approximation having a slope parameter and a zero frequency parameter, and then to determine a timing frequency offset value from the slope parameter of the linear approximation and to determine a carrier frequency offset value from the zero frequency parameter of the linear approximation.

In greater detail, in the modem 100 or modem 101, the analog-digital converter samples the first set of received probe tones to form a first set of sampled tones and samples the second set of received probe tones to form a second set of sampled tones (block 114, FIG. 5); and the processor 108 is further responsive to receive the first set of sampled tones and the second set of sampled tones from the analog-digital converter (block 111, FIGS. 4 and 5). As in the DSP embodiment, the processor 108 is further responsive (block 112, FIG. 4) to perform a Fourier transformation of the first set of sampled tones to form a first set of Fourier transforms and on the second set of sampled tones to form a second set of Fourier transforms (block 301, FIG. 6). The processor 108 is also responsive to form a set of delayed complex conjugates of the first set of Fourier transforms (blocks 303 and 305, FIG. 6), and then to multiply the set of delayed complex conjugates of the first set of Fourier transforms by the second set of Fourier transforms to determine the set of phase differences (multiplier 307, FIG. 6).

Other features of the modem embodiment may also include the processor being further responsive to form the linear approximation by minimizing a least squared error function, FIG. 8A. Also as in the DSP embodiment, in one alternative, the processor of the modem embodiment is further responsive to determine a signal to noise ratio for each tone of the first set of received probe tones and the second set of received probe tones, to form a set of signal to noise ratios, and then to form the linear approximation by minimizing a least squared error function proportionally weighted based upon the set of signal to noise ratios. In another alternative, the processor is further responsive to determine a normalized and average amplitude for each tone of the first set of received probe tones and the second set of received probe tones, to form a set of averaged amplitudes, and then to form the linear approximation by minimizing a least squared error function proportionally weighted based upon the set of averaged amplitudes (FIG. 8B).

Similarly in the modem embodiment, the processor may be further responsive to form the linear approximation by minimizing a least squared error function $$\sum_i w_i(af_i + b + \Phi_i)^2$$

as a function of frequency, and to determine the slope parameter "a" and the zero frequency parameter "b" by $$a = \frac{\sum w_i \sum w_i f_i \Phi_i - \sum w_i \Phi_i \sum w_i f_i}{\sum w_i \sum w_i f_i^2 - (\sum w_i f_i)^2}$$

$$b = \frac{\sum w_i \Phi_i - a \sum w_i f_i}{\sum w_i}$$

which the summations $\Sigma$ are over a parameter "i" in which "i" is a predetermined number of tones of the probe signal "$w_i$" is a weighting parameter, "$f_i$" is a frequency of an $i^{th}$ tone of the probe signal, and "$\Phi_i$" is an $i^{th}$ phase difference from the set of phase differences.

Figure 9:
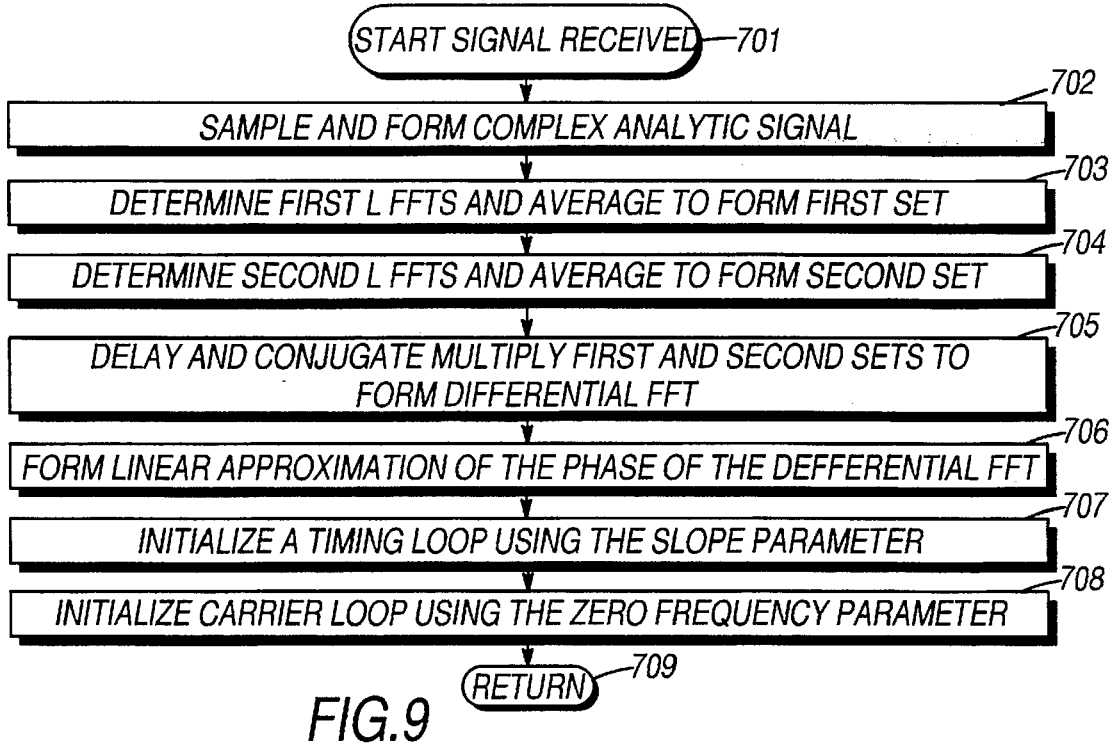
FIG. 9 is a flow diagram for the method of the preferred embodiments of the present invention.

FIG. 9 is a flow diagram for the method of the various preferred embodiments of the present invention. Referring to FIG. 9, the process starts by receiving the probe signal, step 701. The received probe signal is sampled and transformed into a complex analytic signal, step 702. It will be appreciated that this step 702 is analogous to the processing provided by the initial processor 111 in FIGS. 4 and 5.

The complex analytic signal is then delayed, windowed and Fourier transformed or processed to form L FFTs, which are then averaged to form a first set of averaged FFTs, step 708. A second or subsequent portion of the complex analytic signal (such as the portion derived from the nominal power probe signal) is then delayed, windowed and Fourier transformed or processed to form L additional FFTs, which are then normalized (if needed due to different power levels) and averaged to form a second set of averaged FFTs, step 704. These processes are analogous to the functions of the Fourier transform block 301 in FIG. 6 and in FIG. 7. The first set of averaged FFTs are then delayed and formed into complex conjugates, and then multiplied by the second set of averaged FFTs to form a set of differential FFTs (also referred to as the set of phase differences $\Phi_i$), step 705. These processes are analogous to the functions performed by blocks 303, 305 and multiplier 307 in FIG. 6.

Continuing to refer to FIG. 9, the set of differential FFTs are then used to form a weighted linear approximation, fitting the differential FFTs (phases) to a least square error linear approximation as a function of frequency, using the signal to noise ratios or differential FFTs amplitudes as a weighting function, step 706. From the linear approximation, slope and zero frequency parameters are derived. These processes are analogous to the functions performed by block 113 in FIG. 4.

Lastly, for a modem or other DCE embodiment, the slope parameter of the linear approximation may be used to initialize a timing loop to track timing frequency offset, step 707, and the zero-frequency parameter of the linear approximation may be used to initialize a carrier loop to track carrier frequency offset, step 708.

In summary, a method embodiment of the present invention includes a method for determining timing frequency offset and carrier frequency offset, from a transmitted probe signal received via a channel, step 701, FIG. 9. Under the V.34 or other protocols, the transmitted probe signal has a sequence of a plurality of tones having predetermined power, frequency, amplitude and phase characteristics, and the transmitted probe signal is received for a minimum duration having a predetermined number of periods for each of the plurality of received tones to form a plurality of sets of received tones. The method then comprises:

(a) determining a plurality of phase differences between a first set of received tones and a second set of received tones, for each tone frequency of the received probe signal, to form a set of phase differences, steps 702–705, FIG. 9;

(b) forming a linear approximation of phase differences from the set of phase differences as a function of frequency, the linear approximation having a slope parameter and a zero frequency parameter, step 706, FIG. 9;

(c) determining a timing frequency offset value from the slope parameter of the linear approximation, step 707, FIG. 9; and (d) determining a carrier frequency offset value from the zero frequency parameter of the linear approximation, step 708, FIG. 9.

In greater detail, step (a) of the method, the determining a plurality of phase differences, may consist of first sampling the first set of received tones to form a first set of sampled tones and sampling the second set of received tones to form a second set of sampled tones, step 702, FIG. 9; second, performing a Fourier transformation of the first set of sampled tones to form a first set of Fourier transforms and of the second set of sampled tones to form a second set of Fourier transforms, steps 703 and 704, FIG. 9; third, forming a set of delayed complex conjugates of the first set of Fourier transforms, step 705, FIG. 9; and fourth, multiplying the set of delayed complex conjugates of the first set of Fourier transforms by the second set of Fourier transforms to form the set of phase differences, step 705, FIG. 9.

As in the various apparatus embodiments, in the method embodiment, the linear approximation is formed by minimizing a least squared error function (FIG. 8A), and there are two alternative implementations. First, in one alternative, the method includes determining a signal to noise ratio for each tone frequency of the first set of received tones and the second set of received tones, to form a set of signal to noise ratios, and then forming the linear approximation by minimizing a least squared error function proportionally weighted based upon the set of signal to noise ratios. In the second alternative, the method includes determining a normalized and average amplitude for each tone frequency of the first set of received tones and the second set of received tones, to form a set of averaged amplitudes, and then forming the linear approximation by minimizing a least squared error function proportionally weighted based upon the set of averaged amplitudes (FIG. 8B).

Also as in the apparatus embodiments, in the method embodiment, the linear approximation is formed by minimizing a least squared error function $$\sum_i w_i(af_i + b + \Phi_i)^2$$

as a function of frequency, in which the slope parameter "a" and the zero frequency parameter "b" are determined by $$a = \frac{\sum w_i \sum w_i f_i \Phi_i - \sum w_i \Phi_i \sum w_i f_i}{\sum w_i \sum w_i f_i^2 - (\sum w_i f_i)^2}$$

$$b = \frac{\sum w_i \Phi_i - a \sum w_i f_i}{\sum w_i}$$

in which summations $\Sigma$ are over a parameter "i" in which "i" is a predetermined number of tones of the probe signal, "$w_i$" is a weighting parameter, "$f_i$" is a frequency of an ith tone of the probe signal, and "$\Phi_i$" is an $i^{th}$ phase difference from the set of phase differences.

A major advantage of a modem with rapid timing and carrier frequency offset, in accordance with the present invention, is that these frequency offsets may be determined in low signal to noise ratio environments. In one typical DSP-based embodiment, for example, the carrier frequency offset estimation was accurate to within 0.1 Hz and the timing frequency offset estimation was accurate to within 20 ppm at a 20 dB signal to noise ratio.

Another major advantage of the present invention is that it uses computationally efficient FFTs to determine the offsets, resulting in a more efficient implementation having a greater ease of manufacture at a reduced cost compared to other more complicated and less efficient implementations. As a consequence, the various embodiments of the present invention are able to provide data communications equipment with a mechanism for both rapidly and accurately determining and responding to both carrier frequency offset and timing frequency offset given a received probe signal, with a training period which may have a limited duration.

Yet another significant advantage of the present invention is its ability to minimize the effects of noise on the determination of carrier and timing frequency offsets. This favorable effect occurs as a result of, among other things, the novel use of redundant, averaged FFTs and the novel use of the linear approximation methodologies, based upon either the signal to noise ratios or the normalized, average signal amplitudes.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method of determining timing frequency offset and carrier frequency offset, from a transmitted probe signal received via a channel, the transmitted probe signal having a sequence of a plurality of tones having predetermined power, frequency, amplitude and phase characteristics, the transmitted probe signal received for a minimum duration having a predetermined number of periods for each of the plurality of received tones to form a plurality of sets of received tones, the method comprising:

(a) determining a plurality of phase differences between a first set of received tones and a second set of received tones, for each tone frequency of the received probe signal, to form a set of phase differences;

(b) forming a linear approximation of phase differences from the set of phase differences as a function of frequency, the linear approximation having a slope parameter and a zero frequency parameter;

(c) determining a timing frequency offset value from the slope parameter of the linear approximation; and (d) determining a carrier frequency offset value from the zero frequency parameter of the linear approximation.

2. The method of claim 1, wherein the linear approximation is formed by minimizing a least squared error function.

3. The method of claim 1, wherein the determining a plurality of phase differences step (a) further comprises:

(a1) sampling the first set of received tones to form a first set of sampled tones and sampling the second set of received tones to form a second set of sampled tones;

(a2) performing a Fourier transformation of the first set of sampled tones to form a first set of Fourier transforms and of the second set of sampled tones to form a second set of Fourier transforms;

(a3) forming a set of delayed complex conjugates of the first set of Fourier transforms; and (a4) multiplying the set of delayed complex conjugates of the first set of Fourier transforms by the second set of Fourier transforms to form the set of phase differences.

4. The method of claim 1, further comprising:

(e) determining a signal to noise ratio for each tone frequency of the first set of received tones and the second set of received tones, to form a set of signal to noise ratios.

5. The method of claim 4, wherein the linear approximation is formed by minimizing a least squared error function proportionally weighted based upon the set of signal to noise ratios.

6. The method of claim 1, further comprising:

(e) determining a normalized and average amplitude for each tone frequency of the first set of received tones and the second set of received tones, to form a set of averaged amplitudes.

7. The method of claim 6, wherein the linear approximation is formed by minimizing a least squared error function proportionally weighted based upon the set of averaged amplitudes.

8. The method of claim 1, wherein the linear approximation is formed by minimizing a least squared error function $$\sum_i w_i (af_i + b + \Phi_i)^2$$

as a function of frequency, in which "i" is a predetermined number of tones of the probe signal, "$w_i$" is a weighting parameter, "a" is the slope parameter, "$f_i$" is a frequency of an $i^{th}$ tone of the probe signal, "b" is the zero frequency parameter, and "$\Phi_i$" is an $i^{th}$ phase difference from the set of phase differences.

9. The method of claim 8, wherein the slope parameter "a" and the zero frequency parameter "b" are determined by $$a = \frac{\sum w_i \sum w_i f_i \Phi_i - \sum w_i \Phi_i \sum w_i f_i}{\sum w_i \sum w_i f_i^2 - (\sum w_i f_i)^2}$$

$$b = \frac{\sum w_i \Phi_i - a \sum w_i f_i}{\sum w_i}$$

in which summations $\Sigma$ are over a parameter "i" in which "i" is a predetermined number of tones of the probe signal, "$w_i$" is a weighting parameter, "a" is the slope parameter, "$f_i$" is a frequency of an ith tone of the probe signal, "b" is the zero frequency parameter, and "$\Phi_i$" is an $i^{th}$ phase difference from the set of phase differences.

10. An apparatus for determining timing frequency offset and carrier frequency offset, from a transmitted probe signal received via a channel, the transmitted probe signal having a sequence of a plurality of tones having predetermined power, frequency, amplitude and phase characteristics, the probe signal transmitted and received for a minimum duration having a predetermined number of periods for each of the plurality of transmitted tones to form a plurality of sets of received probe tones, the apparatus comprising:

a digital signal processor, the digital signal processor responsive to determine a plurality of phase differences between a first set of received probe tones and a second set of received probe tones, for each received probe tone, to form a set of phase differences; the digital signal processor further responsive to the set of phase differences to determine a linear approximation of phase differences as a function of frequency, the linear approximation having a slope parameter and a zero frequency parameter; the digital signal processor further responsive to determine a timing frequency offset value from the slope parameter of the linear approximation and to determine a carrier frequency offset value from the zero frequency parameter of the linear approximation.

11. The apparatus of claim 10, wherein the digital signal processor is further responsive to form the linear approximation by minimizing a least squared error function.

12. The apparatus of claim 1 0, wherein the digital signal processor is further responsive to receive a a first set of sampled tones and a second set of sampled tones from an analog-digital converter; the digital signal processor further responsive to perform a Fourier transformation of the first set of sampled tones to form a first set of Fourier transforms and on the second set of sampled tones to form a second set of Fourier transforms; the digital signal processor further responsive to form a set of delayed complex conjugates of the first set of Fourier transforms; and the digital signal processor further responsive to multiply the set of delayed complex conjugates of the first set of Fourier transforms by the second set of Fourier transforms to determine the set of phase differences.

13. The apparatus of claim 1 0, wherein the digital signal processor is further responsive to determine a signal to noise ratio for each tone of the first set of received probe tones and the second set of received probe tones, to form a set of signal to noise ratios.

14. The apparatus of claim 13, wherein the digital signal processor is further responsive to form the linear approximation by minimizing a least squared error function proportionally weighted based upon the set of signal to noise ratios.

15. The apparatus of claim 10, wherein the digital signal processor is further responsive to determine a normalized and average amplitude for each tone of the first set of received probe tones and the second set of received probe tones, to form a set of averaged amplitudes.

16. The apparatus of claim 15, wherein the digital signal processor is further responsive to form the linear approximation by minimizing a least squared error function proportionally weighted based upon the set of averaged amplitudes.

17. The apparatus of claim 10, wherein the digital signal processor is further responsive to form the linear approximation by minimizing a least squared error function $$\sum_i w_i(af_i + b + \Phi_i)^2$$

as a function of frequently, in which "i" is a predetermined number of tones of the probe signal, "$w_i$" is a weighting parameter, "a" is the slope parameter, "$f_i$" is a frequency of an $i^{th}$ tone of the probe signal, "b" is the zero frequency parameter, and "$\Phi_i$" is an $i^{th}$ phase difference from the set of phase differences.

18. The apparatus of claim 17, wherein the digital signal processor is further responsive to determine the slope parameter "a" and the zero frequency parameter "b" by $$a = \frac{\sum w_i \sum w_i f_i \Phi_i - \sum w_i \Phi_i \sum w_i f_i}{\sum w_i \sum w_i f_i^2 - (\sum w_i f_i)^2}$$

$$b = \frac{\sum w_i \Phi_i - a \sum w_i f_i}{\sum w_i}$$

in which summations $\Sigma$ are over a parameter "i" in which "i" is a predetermined number of tones of the probe signal, "$w_i$" is a weighting parameter, "a" is the slope parameter, "$f_i$" is a frequency of an $i^{th}$ tone of the probe signal, "b" is the zero frequency parameter, and "$\Phi_i$" is an $i^{th}$ phase difference from the set of phase differences.

19. A modem for data transmission and data reception, the modem having an initial training period for determining timing frequency offset and carrier frequency offset, from a transmitted probe signal received via a channel, the transmitted probe signal having a sequence Of a plurality of tones having predetermined power, frequency, amplitude and phase characteristics, the probe signal transmitted and received for a minimum duration having a predetermined number of periods for each of the plurality of transmitted probe tones to form a plurality of sets of transmitted probe tones, the modem comprising:

a data access arrangement coupleable to a channel to receive the plurality of sets of transmitted probe tones;

an analog-digital converter coupled to the data access arrangement to sample and convert the plurality of sets of transmitted probe tones to form a plurality of sets of received probe tones; and a processor coupled to the analog-digital converter to receive the plurality of sets of received probe tones, the processor responsive to determine a plurality of phase differences between a first set of received probe tones and a second set of received probe tones, for each received probe tone, to form a set of phase differences; the processor further responsive to the set of phase differences to determine a linear approximation of phase differences as a function of frequency, the linear approximation having a slope parameter and a zero frequency parameter; the processor further responsive to determine a timing frequency offset value from the slope parameter of the linear approximation and to determine a carrier frequency offset value from the zero frequency parameter of the linear approximation.

20. The modem of claim 19, wherein the processor is further responsive to form the linear approximation by minimizing a least squared error function.

21. The modem of claim 19, wherein:

the analog-digital converter samples the first set of received probe tones to form a first set of sampled tones and samples the second set of received probe tones to form a second set of sampled tones; and the processor is further responsive to receive the first set of sampled tones and the second set of sampled tones from the analog-digital converter; the processor further responsive to perform a Fourier transformation of the first set of sampled tones to form a first set of Fourier transforms and on the second set of sampled tones to form a second set of Fourier transforms; the processor further responsive to form a set of delayed complex conjugates of the first set of Fourier transforms; and the digital processor further responsive to multiply the set of delayed complex conjugates of the first set of Fourier transforms by the second set of Fourier transforms to determine the set of phase differences.

22. The modem of claim 19, wherein the processor is further responsive to determine a signal to noise ratio for each tone of the first set of received probe tones and the second set of received probe tones, to form a set of signal to noise ratios.

23. The modem of claim 22, wherein the processor is further responsive to form the linear approximation by minimizing a least squared error function proportionally weighted based upon the set of signal to noise ratios.

24. The modem of claim 19, wherein the processor is further responsive to determine a normalized and average amplitude for each tone of the first set of received probe tones and the second set of received probe tones, to form a set of averaged amplitudes.

25. The modem of claim 24, wherein the processor is further responsive to form the linear approximation by minimizing a least squared error function proportionally weighted based upon the set of averaged amplitudes.

26. The modem of claim 19, wherein the processor is further responsive to form the linear approximation by minimizing a least squared error function $$\sum_i w_i(af_i + b + \Phi_i)^2$$

as a function of frequency, in which "i" is a predetermined number of tones of the probe signal, "$w_i$" is a weighting parameter, "a" is the slope parameter, "$f_i$" is a frequency of an $i^{th}$ tone of the probe signal, "b" is the zero frequency parameter, and "$\Phi_i$" is an $i^{th}$ phase difference from the set of phase differences.

27. The modem of claim 26, wherein the processor is further responsive to determine the slope parameter "a" and the zero frequency parameter "b" by $$a = \frac{\sum w_i \sum w_i f_i \Phi_i - \sum w_i \Phi_i \sum w_i f_i}{\sum w_i \sum w_i f_i^2 - (\sum w_i f_i)^2}$$

$$b = \frac{\sum w_i \Phi_i - a \sum w_i f_i}{\sum w_i}$$

in which the summations $\Sigma$ are over a parameter "i" in which "i" is a predetermined number of tones of the probe signal, "$w_i$" is a weighting parameter, "a" is the slope parameter, "$f_i$" is a frequency of an $i^{th}$ tone of the probe signal, "b" is the zero frequency parameter, and "$\Phi_i$" is an $i^{th}$ phase difference from the set of phase differences.

* * * * *